United States Patent
Patelczyk et al.

(10) Patent No.: US 12,085,234 B2
(45) Date of Patent: *Sep. 10, 2024

(54) STORAGE TANK WITH PRESSURE ACTUATED FILL TERMINATION ASSEMBLY

(71) Applicant: Chart Inc., Ball Ground, GA (US)

(72) Inventors: Jeff Patelczyk, Cumming, GA (US); Ian Neeser, Blomington, MN (US); Paul Drube, Lakeville, MN (US)

(73) Assignee: Chart Inc., Ball Ground, GA (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/856,287

(22) Filed: Jul. 1, 2022

(65) Prior Publication Data
US 2022/0341545 A1   Oct. 27, 2022

Related U.S. Application Data

(63) Continuation of application No. 16/728,301, filed on Dec. 27, 2019, now Pat. No. 11,402,067.

(60) Provisional application No. 62/785,922, filed on Dec. 28, 2018.

(51) Int. Cl.
*F17C 6/00* (2006.01)
*F17C 13/02* (2006.01)
*F17C 13/04* (2006.01)

(52) U.S. Cl.
CPC ............ *F17C 6/00* (2013.01); *F17C 13/025* (2013.01); *F17C 13/04* (2013.01); *F17C 2223/0161* (2013.01); *F17C 2250/0439* (2013.01); *F17C 2250/0491* (2013.01); *F17C 2250/0495* (2013.01); *F17C 2250/075* (2013.01)

(58) Field of Classification Search
CPC ...... F17C 2223/0161; F17C 2250/0439; F17C 2250/0491; F17C 2250/0495; F17C 2250/075; F17C 6/00; F17C 13/04; F17C 13/025
See application file for complete search history.

(56) References Cited

U.S. PATENT DOCUMENTS

| | | |
|---|---|---|
| 1,926,513 A | 9/1933 | Clamer |
| 2,120,929 A | 6/1938 | Clifford |
| 2,551,836 A | 5/1951 | Gendreau |
| 2,756,765 A | 7/1956 | Agule et al. |
| 2,919,102 A | 12/1959 | Peters |
| 2,966,039 A | 12/1960 | Williamson |
| 3,099,222 A | 7/1963 | Poliseo |
| 3,206,938 A | 9/1965 | Damsz |
| 3,256,686 A | 6/1966 | Lindberg, Jr. |
| 3,262,280 A | 7/1966 | Chaney |
| 3,304,948 A | 2/1967 | Demeo |
| 3,433,029 A | 3/1969 | Pflieger |
| 3,547,116 A | 12/1970 | Manely |

(Continued)

FOREIGN PATENT DOCUMENTS

GB   2264159 A   8/1993

OTHER PUBLICATIONS

Extended European Search Report for European Application No. EP 19219870 Dated May 15, 2020.

*Primary Examiner* — Filip Zec
(74) *Attorney, Agent, or Firm* — Cook Alex Ltd.

(57) ABSTRACT

Gas pressure actuated fill termination valves for cryogenic liquid storage tanks and storage tanks containing the same.

14 Claims, 9 Drawing Sheets

(56) References Cited

U.S. PATENT DOCUMENTS

| | | | |
|---|---|---|---|
| 3,561,421 A | 2/1971 | Body | |
| 3,570,263 A | 3/1971 | Tobias | |
| 3,638,442 A | 2/1972 | Hedstrom | |
| 3,845,636 A | 11/1974 | Van Mal et al. | |
| 4,135,548 A | 1/1979 | Sears | |
| 4,334,410 A | 6/1982 | Drumare | |
| 5,899,225 A | 5/1999 | Yokogi | |
| 6,354,088 B1 * | 3/2002 | Emmer | F17C 13/025 141/82 |
| 6,659,730 B2 * | 12/2003 | Gram | F04B 19/06 417/901 |
| 7,028,489 B1 * | 4/2006 | Hall | F17C 9/00 137/563 |
| 7,036,335 B2 | 5/2006 | Eberhardt et al. | |
| 8,910,487 B2 * | 12/2014 | Hylands | F17C 13/084 62/50.7 |
| 9,915,250 B2 * | 3/2018 | Brasche | F01L 9/10 |
| 10,126,024 B1 * | 11/2018 | Chui | F25B 25/00 |
| 10,358,332 B2 | 7/2019 | Clusserath et al. | |
| 11,835,270 B1 * | 12/2023 | Vaisman | F25B 19/00 |
| 2002/0157402 A1 | 10/2002 | Drube et al. | |
| 2006/0180236 A1 | 8/2006 | Hoke | |
| 2013/0263610 A1 * | 10/2013 | Mackey | F17C 5/007 62/50.1 |
| 2016/0245426 A1 * | 8/2016 | Fowler | F17C 13/025 |
| 2019/0211970 A1 * | 7/2019 | Ruiz-Rodriguez | F17C 5/06 |
| 2020/0149654 A1 * | 5/2020 | Cao | F16K 39/02 |

* cited by examiner

STORAGE TANK WITH PRESSURE ACTUATED FILL TERMINATION ASSEMBLY

CLAIM OF PRIORITY

This application is a continuation of U.S. patent application Ser. No. 16/728,301, filed Dec. 27, 2019, which claims the benefit of U.S. Provisional Application No. 62/785,922, filed Dec. 28, 2018, the contents of both of which are hereby incorporated by reference.

FIELD OF THE DISCLOSURE

The present disclosure relates generally to systems and methods for terminating the filling of tank, and more particularly, to a cryogenic storage tank, such as a tank for storing liquefied gas, that has a gas pressure actuated fill termination assembly which is actuated when the liquid reaches a desired level in the tank.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a cryogenic liquid storage tank that includes a vessel for containing a cryogenic liquid and a fill pipe in communication with the vessel wherein the vessel is filled with the cryogenic liquid via the fill pipe. The tank also includes a fill termination assembly associated with the fill pipe. The fill termination assembly includes a valve having an open position for allowing cryogenic liquid to flow through the fill pipe during filing of the vessel and a closed position for preventing cryogenic liquid from flowing through the fill pipe when the vessel has been filled with a selected amount of cryogenic liquid. The fill termination assembly moves from the open position to the closed position when a pressure of a gas within the fill termination assembly decreases to a threshold pressure, the pressure of the gas decreasing to the threshold pressure when the vessel is filled to the selected amount.

DETAILED DESCRIPTION OF EMBODIMENTS

Figure 1:
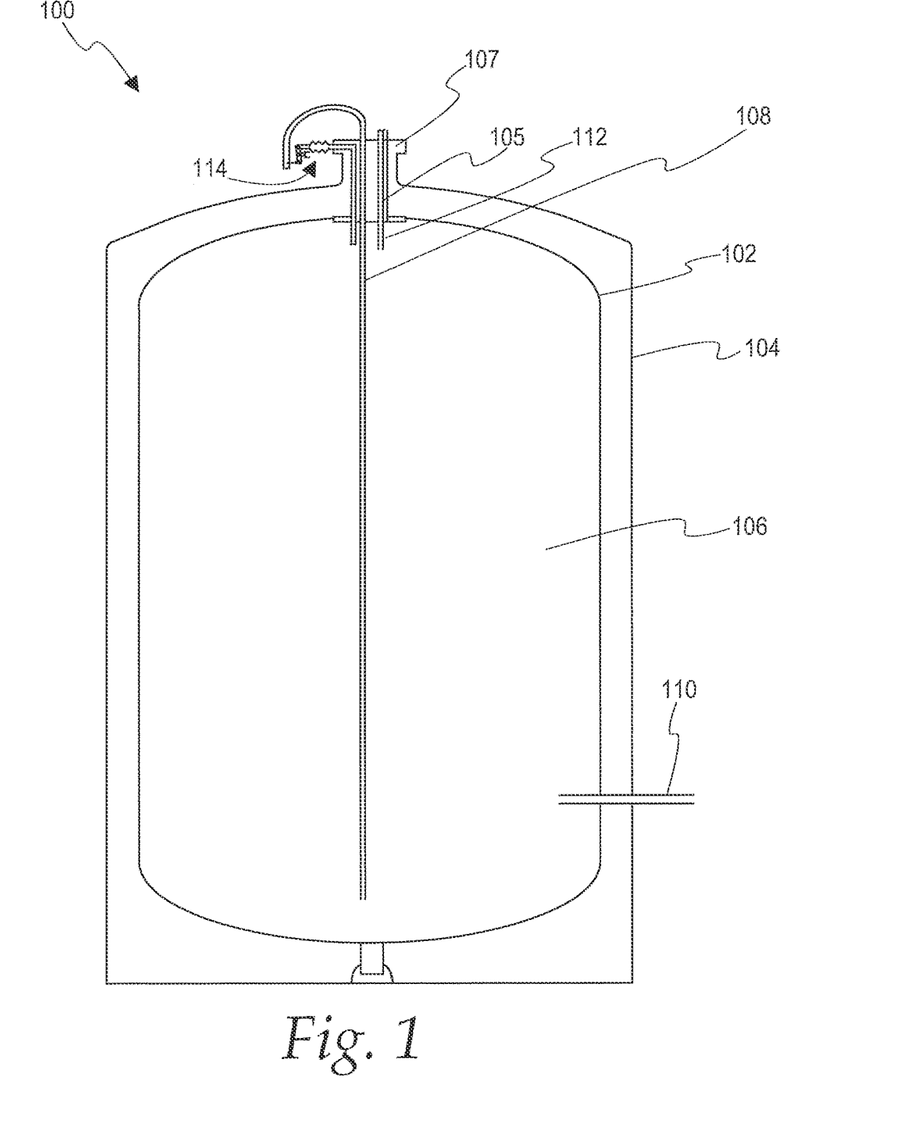
FIG. 1 illustrates one embodiment of a storage tank having a pressure actuated fill termination assembly in accordance with the present disclosure which is actuated when the liquid reaches a desired level in the tank.

FIG. 1 illustrates an implementation of a storage tank 100. In the illustrate embodiment, the storage tank 100 is a vertical storage tank. In other embodiments, the storage tank 100 may be a horizontal storage tank. The storage tank 100 may be a cryogenic liquid storage tank. The storage tank 100 includes an inner vessel 102. The inner vessel 102 is enclosed by an outer vessel 104. The inner vessel 102 can enclose an interior chamber 106. The inner vessel 102 is joined to the outer vessel 104 by an inner vessel support member 105. The inner vessel support member 105 may be connected, at its top end, to an outer component (for example, outer knuckle or outer joint) 107 or to an outer vessel. The inner chamber 106 receives the liquefied gas through a fill pipe 108, stores the liquefied gas, and provides fluid to a use device (for example, a laser cutter, a welder, a food refrigeration device, or any other suitable device) through a withdrawal pipe 110, which may be located at the bottom of the tank. In an alternative embodiment, the fill pipe 108 may also serve as a withdrawal pipe. In this embodiment, fill pipe 108 may include a withdrawal port or pipe 110a (shown in dashed line in FIG. 2). The withdrawal port 110a may be connected by any suitable connection, such as a tee-fitting. The withdrawal port 110a may also include a valve. Both the withdrawal pipe 110 and withdrawal port 110a may be used for bottom withdrawal from the tank. There may be other paths out of the inner vessel to fill and remove the liquid as well. The fill and withdrawal pipes may be any suitable conduit for conveying or allowing the flow of fluid therethrough. Excess vapor can be exhausted through a vent line 112. The fill pipe 108, and the vent line 112 pass through the inner vessel support member 105, which is open from both top and bottom. In one implementation, the stay and support members can be tubes. In some other implementations, the members can be other types of similar structures, such as passages, pipes, or the like. The cross-sections of these tubes and other structures can have various shapes, such as a circle, ellipsis, square, triangle, pentagon, hexagon, polygon, and other shapes.

The location of the entry of the piping (that is, the fill pipe 108, and the vent line 112) can be advantageous, because vapor, which is at the top, can be removed more easily. For example, the vent line 112 facilitates a removal of excess gas pressure when the pressure in the internal chamber 106 exceeds a threshold.

When the tank 100 is employed to store cryogenic liquids, the liquids may be liquefied gases. For example, the cryogenic liquids can be at least one of nitrogen, helium, neon, argon, krypton, carbon dioxide, hydrogen, liquefied natural gas, and oxygen, although other types of gases are within the scope of this disclosure.

Figure 2:
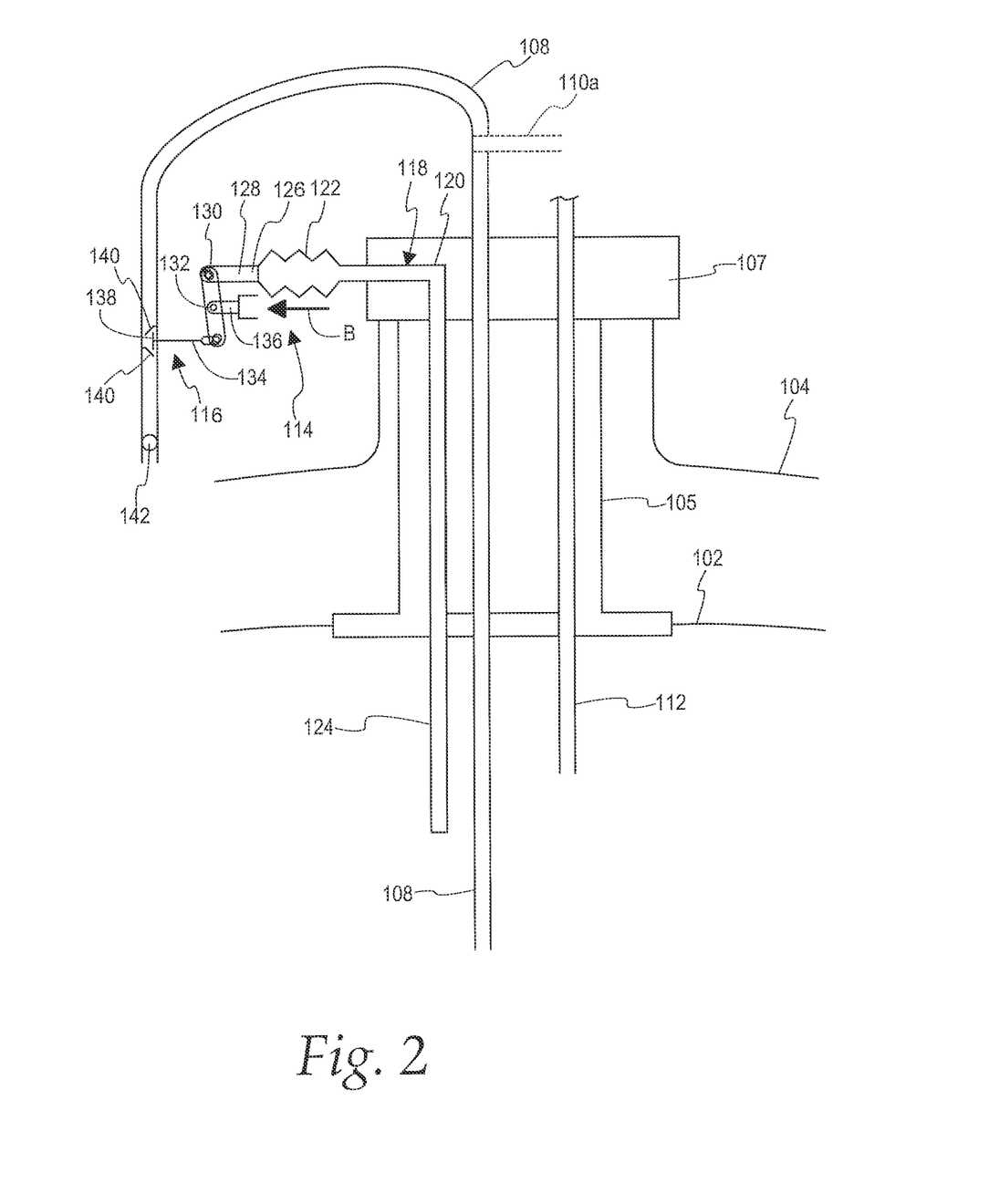
FIG. 2 is an enlarged view of the top of the storage tank of FIG. 1 shown with the pressure actuated fill termination assembly in an open position.
Figure 3:
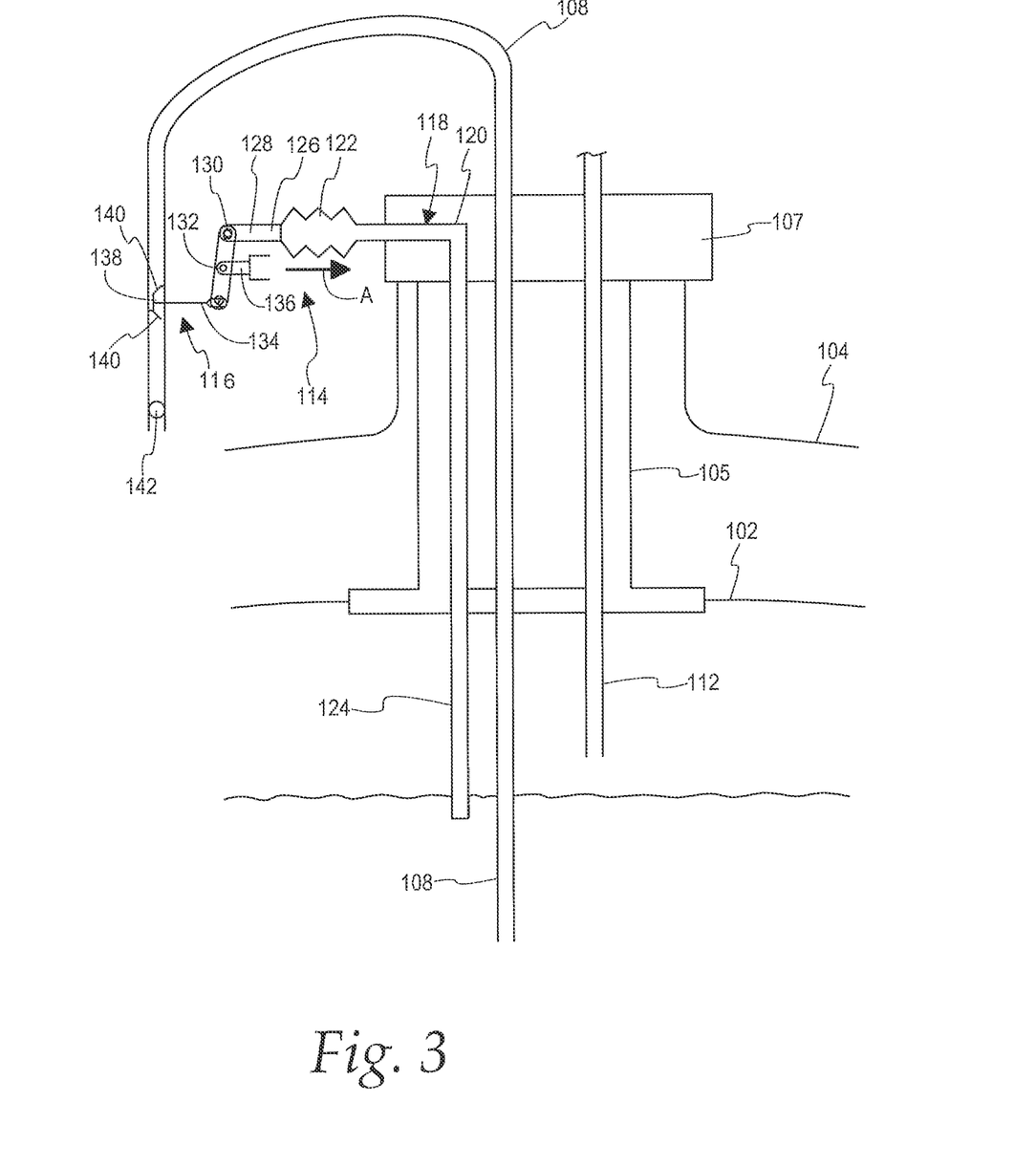
FIG. 3 is an enlarged view of the top of the storage tank of FIG. 1 shown with the pressure actuated fill termination assembly in a closed position.

Referring to FIGS. 1-3, the tank 100 may include a fill termination assembly 114 associated with or operatively connected with the fill pipe 108. The fill termination assembly 114 is a gas pressure actuated fill termination assembly that actuates a shut-off valve when the level of the liquid reaches a desired level within the tank. The assembly 114 includes a valve 116 having an open position (FIG. 2) for allowing cryogenic liquid to flow through the fill pipe 108 during filing of the vessel 102. The valve 116 moves to a closed position (FIG. 3) for preventing cryogenic liquid from flowing through the fill pipe 108 when the vessel has been filled with a selected amount of cryogenic liquid 115. The fill termination assembly also includes a chamber or gas bulb 118, which contains a gas(es), including but not limited to, air, nitrogen, argon, carbon dioxide and helium. The chamber 118 is preferably a closed system, in that the chamber 118 is sealed off from the surrounding environment during use. The chamber 118 of the fill termination assembly 114 includes a static segment 120, which may be a rigid portion, and movable segment 122, which may be flexible and/or expandable/contractible. The static segment 120 generally does not move relative to the tank 110 and may include a portion 124 that at least partially extends into the inner chamber 106 of vessel 102. In one embodiment, the static segment 120 may be a metal tube that is attached to the tank and extends through support member 105 and into chamber 106 of inner vessel 102. In other embodiments, the chamber 118 of the fill termination assembly 114 may extend into the inner vessel at other locations.

The moveable segment 122 is moveable relative to the static segment 120. In one embodiment, the moveable segment 122 may be an expandable/contractible segment. For example, the moveable segment 122 may be the illustrated member having concertina folds or bellows and may be made from a metal. The moveable segment 122 also may be any other suitable moveable member, such as a piston. The moveable segment 122 moves in response to the decreases and increases of the pressure of the gas(es) within the chamber 118. That is, when the pressure of the gas decreases within the chamber 118, the moveable segment 122 moves in a first direction, as indicated by arrow A in FIG. 3. In the illustrated embodiment, the moveable segment 122 contracts by compression of the bellows. When the pressure of the gas increases within chamber 118, the moveable segment 112 moves in a second direction, as indicated by arrow B in FIG. 2. In the illustrated embodiment, the moveable segment 122 expands by the bellows moving apart.

Moveable segment 122 is operative connected to the valve 116 such that movement of the moveable segment 122 actuates the valve 116. In the illustrated embodiment, when the moveable segment 122 moves in the first direction A (FIG. 3), the moveable segment 122 actuates the valve 116 to move into the closed position. Conversely, when the moveable segment 122 moves in second direction B (FIG. 2), the moveable segment 122 actuates the valve 116 to move into the opened position. In the illustrated embodiment, one end 126 of an arm 128 is attached to the moveable segment 122. In the figures, the arm 128 is shown as being attached to the free end of the moveable segment 122. In other embodiments, the arm 128 may be attached at other locations of the moveable segment 122. The other end 130 of the arm 128 is attached to one end of a lever 132. The other end of the lever 132 is attached to a stem 134 of valve 116. The lever 132 includes a pivot point 136 between the ends of the lever 132. The pivot point 136 may be stationary. For example, it may be attached to the tank or other stationary support. The stem 134 extends into the fill pipe 108 and terminates at a disc or head 138. The valve 116 also includes valve seats 140. When the head 138 mates with the valve seats 140, the valve 116 is closed and prevents liquid from flowing through the fill pipe 108.

In other embodiments, the chamber 118 may be attached to the valve 116 in other manners. For example, the chamber 118 or the moveable segment may be electronically (electronic circuit) or wirelessly connected to the valve for valve actuation.

Referring to FIG. 2, the fill pipe 108 may also include a main valve 142, which may be located in the line before or after valve 116. To fill the tank 100, a supply of cryogenic liquid (not shown) is connected to fill pipe 108 and the main valve 142 is opened. The valve 116 of the fill termination assembly 114 is in the opened position, i.e. the valve head 138 is spaced from and unseated from the seats 140, and the moveable segment 122 is in an expanded condition. The liquid flows through fill pipe 108 and into vessel 102. Referring to FIG. 3, when the vessel 102 is filled with a selected amount of cryogenic liquid, the liquid 115 contacts the chamber 118 of the termination assembly 114. For example, the liquid 115 contacts the chamber 118 at portion 124. The portion 124 of the chamber can vary in length, depending of the desired amount of liquid 115 to fill the vessel 102.

When the liquid 115 contacts the chamber 118, some of the gas within chamber condenses to liquid, which results in a decrease in gas pressure. Referring to FIG. 3, when the pressure decreases to a threshold pressure, the moveable segment 122 moves in the first direction A, thereby actuating the valve 116 to the closed position. That is, the arm 128 attached to moveable segment 122 pulls on the lever 132. The lever 132 pushes the valve stem 134, moving the valve head 138 into engagement with the valve seats 140. The closing of the valve 116 terminates the filing of the tank 100, and the main valve 142 of the fill pipe 108 may then be closed and the supply may be disconnected from the fill pipe.

Figure 4:
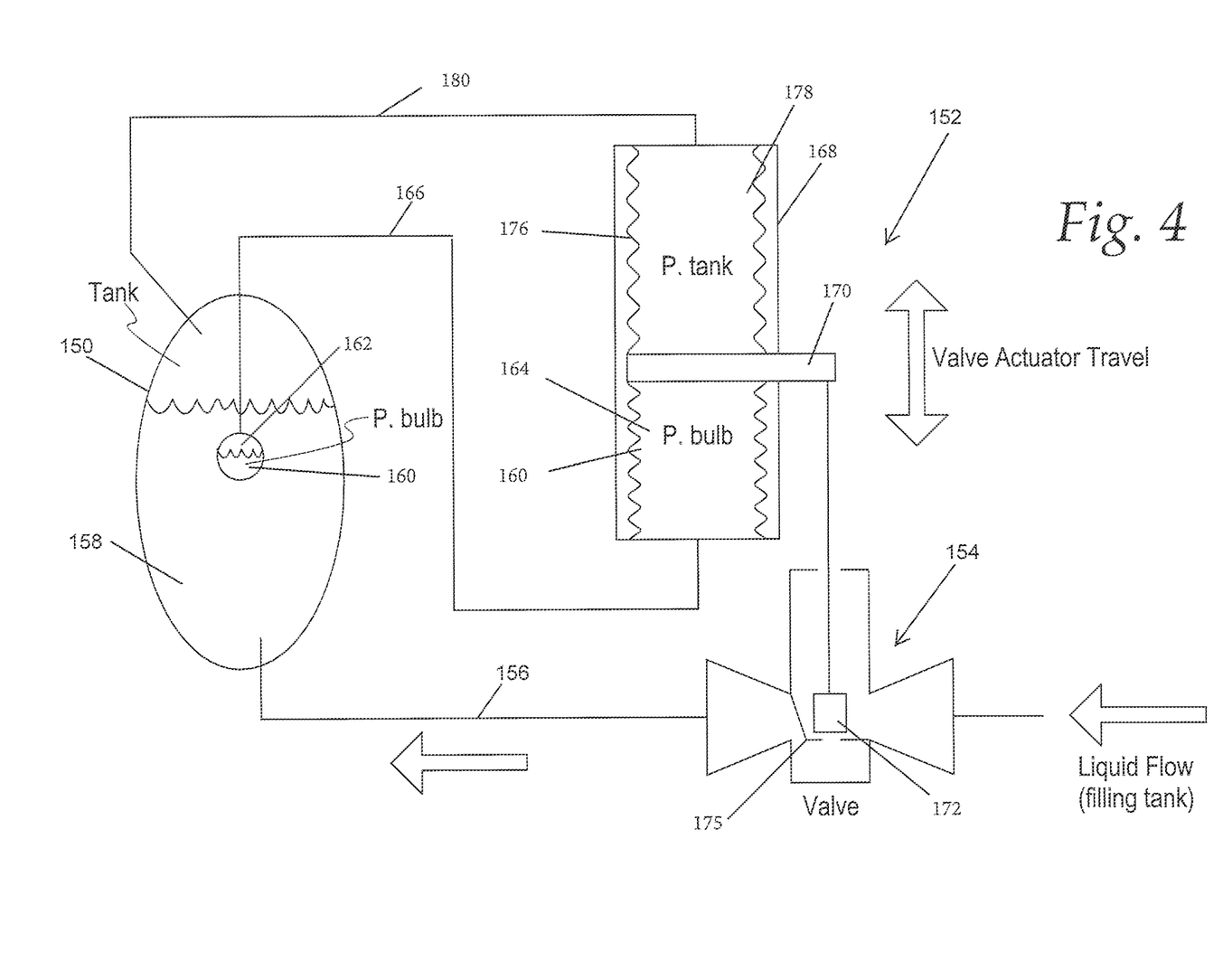
FIG. 4 is a schematic illustration of another embodiment of a storage tank having a pressure actuated fill termination assembly.

FIG. 4 provides a schematic illustration of another embodiment of storage tank 150 that includes a fill termination assembly 152. The assembly 152 includes a valve 154 having an open position for allowing cryogenic liquid to flow through the fill pipe 156 during filling of the tank 150. The valve 154 moves to a closed position (not shown) for preventing cryogenic liquid from flowing through the fill pipe 156 when the tank 150 has been filled with a selected amount of cryogenic liquid 158. The fill termination assembly 152 also includes a chamber or gas pressure bulb 160, which contains a gas(es), including but not limited to, air, nitrogen, argon, carbon dioxide and helium. The chamber 160 is preferably a closed system, in that the chamber 160 is sealed off from the surrounding environment during use.

The pressure bulb 160 includes a first rigid portion 162 located within the tank 150 and a second flexible and/or expandable/contractible portion 164 located outside of the tank 150. The first and second portions 162 and 164 may in communication by a line or pipe 166. The first portion 162 may be made from a metal such as steel. The second flexible portion 164 may be made of metal bellows that expand and contract with the change of pressure within the chamber 160. As the pressure within the chamber 160 increases, the second flexible portion 164 expands, and as the pressure decreases, the second flexible portion contracts. In the illustrated embodiment, the second flexible portion 164 of the chamber 160 is located within a housing 168. When the pressure increases within the chamber 160, the second flexible portion 164 expands upward within the housing.

When the pressure decreases within the chamber 160, the second flexible portion 164 contracts downward within the housing.

As the second flexible portion 164 moves, it actuates the valve 154. In the illustrated embodiment, an arm 170 is associated with the second flexible portion 164. Arm 170 is connected to or defines the top of the second flexible portion 164. The arm 170 is operatively connected to a valve head 172 of the valve 154. As the second flexible portion 164 contracts, the arm 170 moves downward to engage the valve head 174 with the valve seat 175. As the second flexible portion 164 expands, the arm 170 moves upward to disengage the valve head 174 from the valve seat 175.

Optionally, the fill termination assembly 152 includes a second pressure chamber or bulb 176 is in communication with the tank 150 and moves in response to pressure changes in the tank 150. The second pressure chamber 176 includes a flexible and/or expandable/contractible portion 178 that moves based on the pressure of the tank. The flexible portion 178 may be in communication with the inner chamber of the tank 150. In the illustrated embodiment, the flexible portion 178 may communicate with the tank through pipe or passageway 180. The flexible portion 178 may be similar in size, structure, shape and materials to that of flexible portion 164 of chamber 160. The flexible portion 178 may be located in housing 168 opposite of the flexible portion 164 of chamber 160. The flexible portion 178 may be connected to arm 170 or the arm 170 may define the bottom wall of the flexible portion 178. In the illustrated embodiment arm 170 is located between flexible portion 164 and flexible portion 178.

When the pressure within the tank 150 decreases, flexible portion 178 contracts, pulling arm 170 upward. When pressure within the tank increases, the flexible portion 178 expands pushing arm 170 downward. Flexible portion 164 and flexible portion 178 may work in conjunction to open and close the valve. Additionally, the size of the flexible portions 164 and 178 and the amount of pressure within the chamber 160 may be adjusted or tuned to optimize valve actuation, depending on the desired use. For example, when the tank 150 is being filled and the level of the liquid reaches first portion 162 of chamber 160, the gas within chamber 160 is cooled and the pressure within chamber 160 decreases. As pressure decreases within chamber 160, the flexible portion 164 contracts, pulling arm 170 downward to close the valve 154. Simultaneously, as the tank 150 is filled with liquid 158, pressure within the tank increases and the flexible portion 178 of chamber 176 expands pushing the arm 170 downward also to close the valve.

Figure 5:
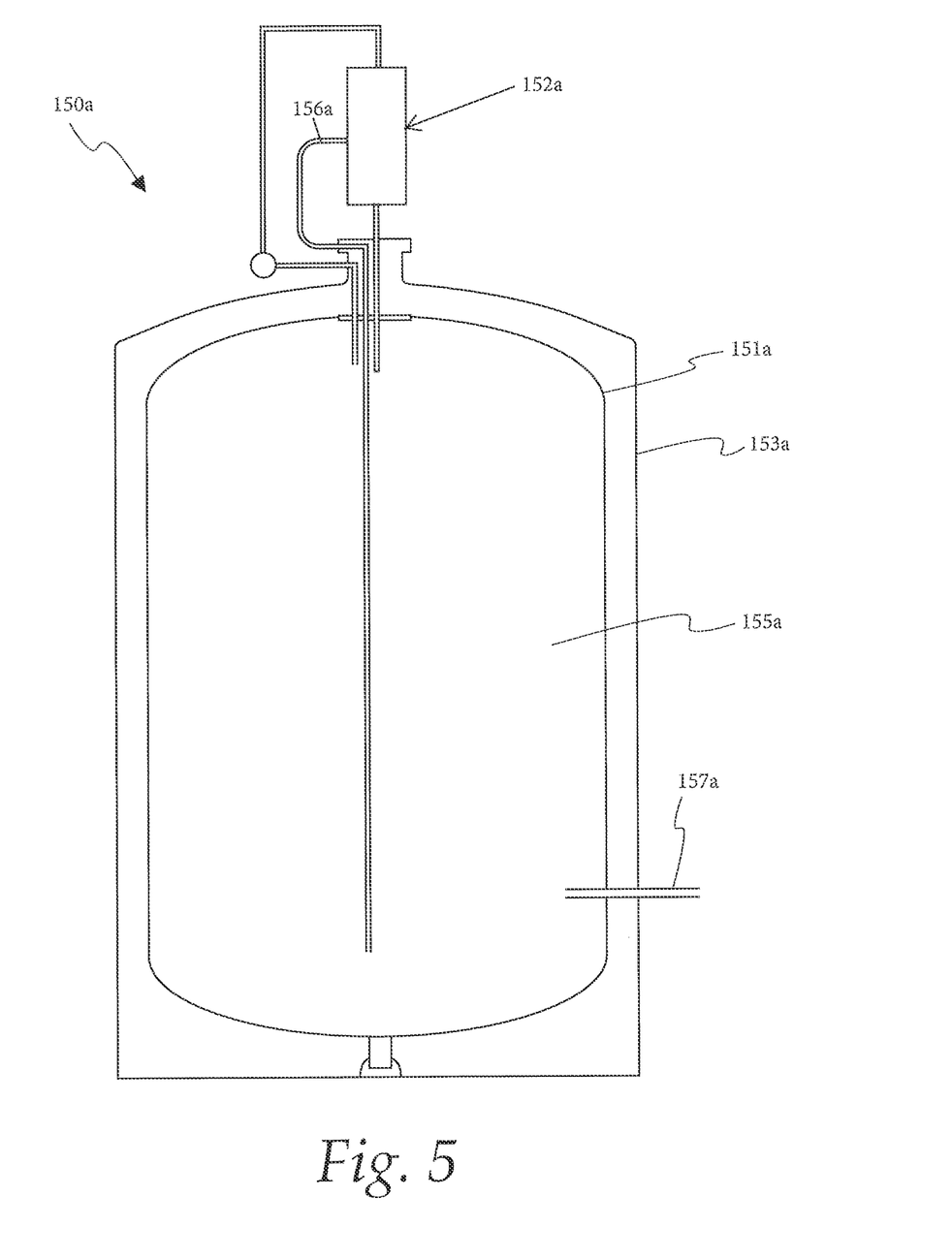
FIG. 5 is illustrates another embodiment of a storage tank having a pressure actuated fill termination assembly in accordance with the present disclosure which is actuated when the liquid reaches a desired level in the tank.
Figure 6:
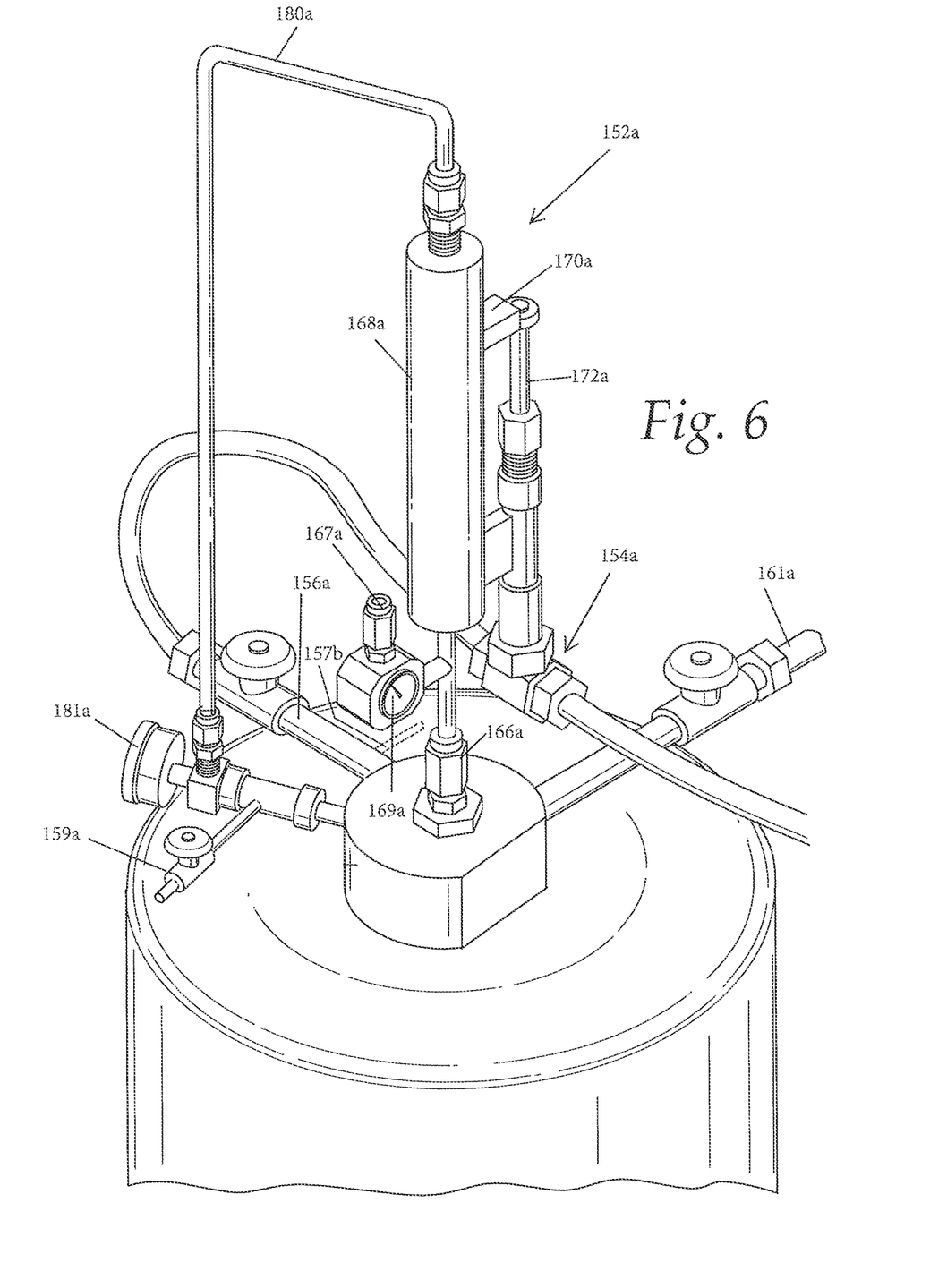
FIG. 6 is an enlarged view of the top of the storage tank of FIG. 5.

FIGS. 5-8 illustrate one embodiment of a tank 150a that includes a pressure actuated fill termination assembly 152a. Referring to FIG. 5, the storage tank 150a is similar to tank 100 described above. The storage tank includes an inner vessel 151a that is enclosed by an outer vessel 153a. The inner vessel 151a can defines an interior chamber 155a. Referring to FIGS. 5 and 6, the tank 150a includes a fill pipe 156a for filling the tank and provides cryogenic liquid through a withdrawal pipe 157a, which may be located at the bottom of the tank. In an alternative embodiment, the fill pipe 156a may also serve as a withdrawal pipe. In this embodiment, fill pipe 156a may include a withdrawal port or pipe 157b (shown in dashed line in FIG. 6). The withdrawal port 157b may be connected by any suitable connection, such as a tee-fitting. There may be other paths out of the inner vessel to fill and remove the liquid as well. Excess vapor can be exhausted through a vent line 159a and the tank 150a may include a gas use line 161a.

Figure 7:
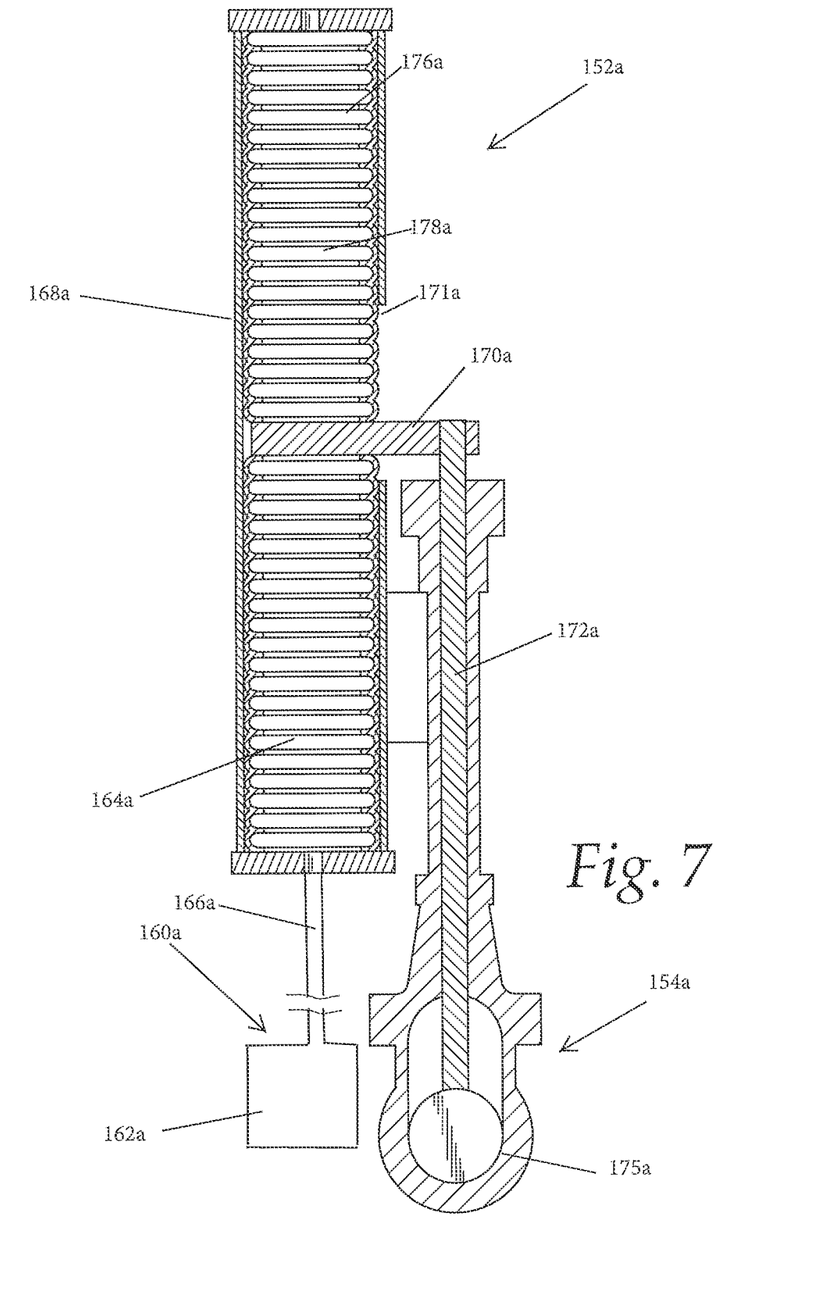
FIGS. 7 and 8 are cross-sectional views of the fill termination assembly.
Figure 8:
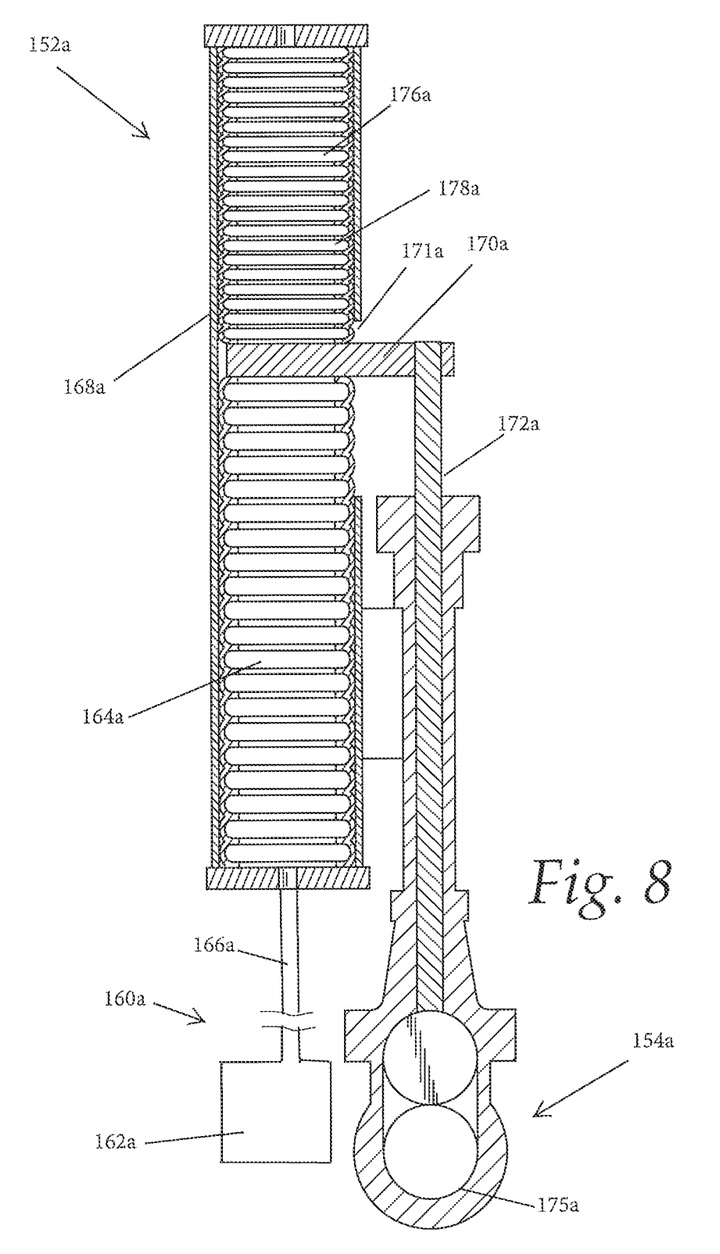

Referring to FIGS. 6-8, the termination assembly 152a includes a valve 154a connected to fill pipe 156a. The valve 154a has an open position (FIG. 8) for allowing cryogenic liquid to flow through the fill pipe 156a during filling of the tank 150a. The valve 154a moves to a closed position (FIG. 7) for preventing cryogenic liquid from flowing through the fill pipe 156a when the tank 150a has been filled with a selected amount of cryogenic liquid. The fill termination assembly 152a also includes a chamber or gas pressure bulb 160a, which contains a gas(es), including but not limited to, air, nitrogen, argon, carbon dioxide and helium. The chamber 160a is preferably a closed system, in that the chamber 160a is sealed off from the surrounding environment during use.

The pressure bulb 160a includes a first rigid portion 162a located within the tank 150a and a second flexible and/or expandable/contractible portion 164a located outside of the tank 150a. The first and second portions 162a and 164a may in communication by a line or pipe 166a. The pipe may include a fill port/vent 167a and a pressure gage 169a for monitoring pressure within the chamber 160a. The first portion 162a may be made from a metal such as steel. The second flexible portion 164a may be made of metal bellows that expand and contract with the change of pressure within the chamber 160a. As the pressure within the chamber 160a increases, the second flexible portion 164a expands, and as the pressure decreases, the second flexible portion contracts. In the illustrated embodiment, the second flexible portion 164a of the chamber 160a is located within a housing 168a. When the pressure increases within the chamber 160a, the second flexible portion 164a expands upward within the housing 168a. When the pressure decreases within the chamber 160a, the second flexible portion 164a contracts downward within the housing.

As the second flexible portion 164a moves, it actuates the valve 154a. In the illustrated embodiment, an arm 170a is associated with the second flexible portion 164a. Arm 170a is connected to or defines the top of the second flexible portion 164a. The arm 170a extends out or a slit or opening 171a in housing 168a and is operatively connected to a valve head 172a of the valve 154a. As the second flexible portion 164a contracts, the arm 170a moves downward to engage the valve head 174a with the valve seat 175a. As the second flexible portion 164a expands, the arm 170a moves upward to disengage the valve head 174a from the valve seat 175a. The valve 154a may be any suitable valve, including but not limited to, a gate valve or ball valve.

The fill termination assembly 152a includes a second pressure chamber or bulb 176a is in communication with the tank 150a and moves in response to pressure changes in the tank 150a. The second pressure chamber 176a includes a flexible and/or expandable/contractible portion 178a that moves based on the pressure of the tank. The flexible portion 178a may be in communication with the inner chamber of the tank 150a. In the illustrated embodiment, the flexible portion 178a may communicate with the tank through pipe or passageway 180a (FIG. 6). The pipe 180a may have a pressure gauge 181a associated therewith for monitoring pressure within the tank 150a. The flexible portion 178a may be similar in size, structure, shape and materials to that of flexible portion 164a of chamber 160a. The flexible portion 178a may be located in housing 168a opposite of the flexible portion 164a of chamber 160a. The flexible portion 178a may be connected to arm 170a or the arm 170a may define the bottom wall of the flexible portion 178a. In the illustrated embodiment arm 170a is located between flexible portion 164a and flexible portion 178a.

When the pressure within the tank 150a decreases, flexible portion 178a contracts, pulling arm 170a upward. When pressure within the tank increases, the flexible portion 178a expands pushing arm 170a downward. Flexible portion 164a and flexible portion 178a may work in conjunction to open and close the valve. Additionally, the size of the flexible portions 164a and 178a and the amount of pressure within the chamber 160a may be adjusted or tuned to optimize valve actuation, depending on the desired use. When the tank 150a is being filled and the level of the liquid reaches first portion 162a of chamber 160a, the gas within chamber 160a is cooled and the pressure within chamber 160a decreases. As pressure decreases within chamber 160a, the flexible portion 164a contracts, pulling arm 170a downward to close the valve 154a. Simultaneously, as the tank 150a is filled with liquid, pressure within the tank increases and the flexible portion 178a of chamber 176a expands pushing the arm 170a downward also to close the valve.

Figure 9:
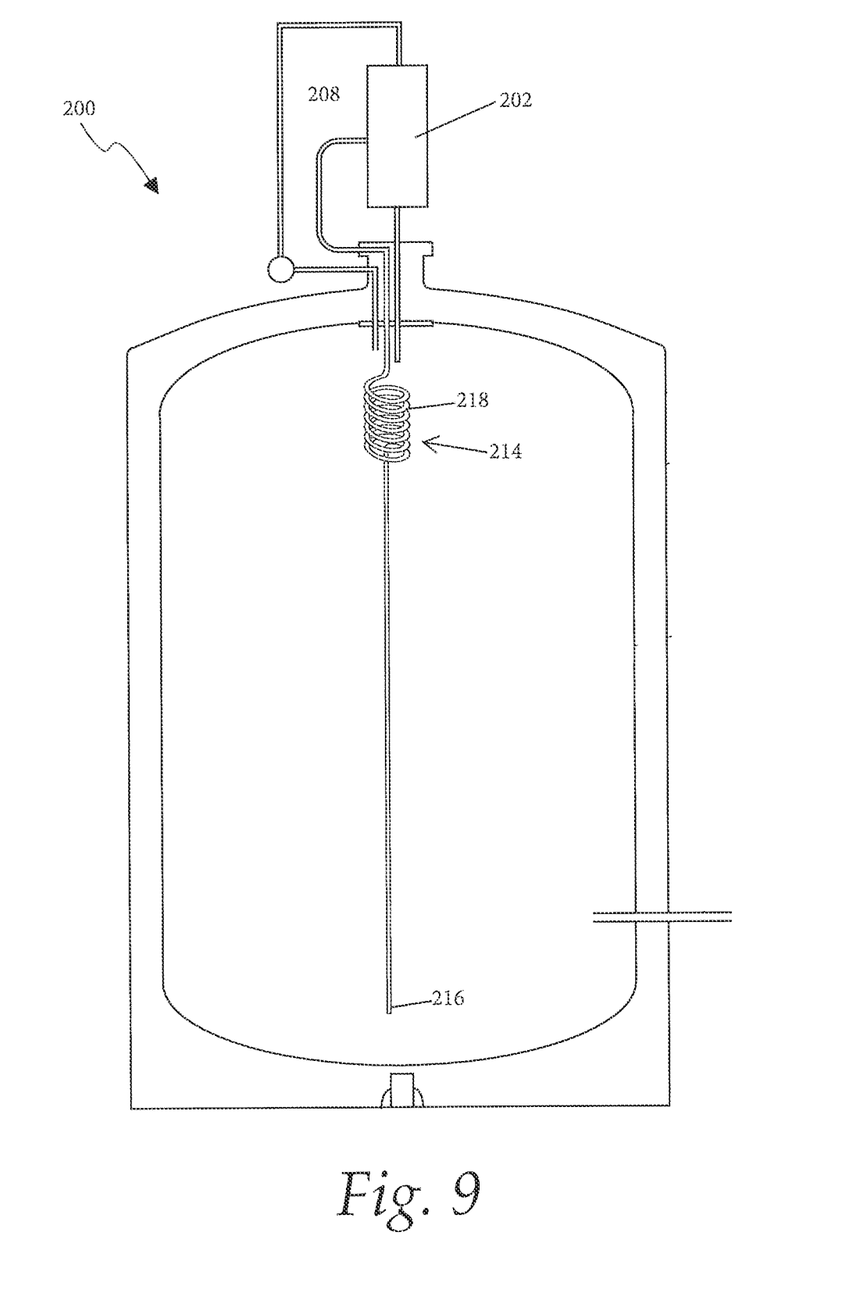
FIG. 9 is illustrates another embodiment of a storage tank having a pressure actuated fill termination assembly in accordance with the present disclosure which is actuated when the liquid reaches a desired level in the tank.

FIG. 9 illustrates another embodiment of a tank 200 that includes a valve termination assembly 202, such as any of the valve termination assemblies described herein, and a heat exchanger 214. The heat exchanger 214 has a heat exchanger passageway therethrough that is in fluid communication with the fill pipe 208 so that cold liquid coming in through fill pipe 208 flows through the heat exchanger 214. The heat exchanger 214 includes an outlet end 216 in fluid communication with the heat exchanger passageway, wherein the liquid is dispensed from the outlet end and into tank 200. In one embodiment the outlet end 216 is positioned or located so as to dispense the incoming liquid into an existing liquid volume of the tank, which is similar to a traditional bottom fill system.

The heat exchanger 214 may be the illustrated coiled heat exchanger 218. In other embodiments, the heat changer may be a serpentine heat exchanger or tube heat exchanger. The heat exchanger 214 is located in the tank 200, and is preferably located in the ullage or headspace of the tank. As the cold incoming liquid flows through the heat exchanger 214, the heat exchanger condenses the hotter gas around it, thus reducing the vapor pressure within the tank 200. Additionally, as liquid is dispensed out of the outlet end 216 of the heat exchanger near the bottom of the tank 200, vapor pressure builds within the tank, similar to that of a traditional bottom fill. As the level of liquid increases, the gas space compresses, and the pressure in the tank rises as a result. The heat exchanger, e.g. coil, serpentine or tube, can be differently sized and shaped depending on the tank and the type of liquid the tank is designed to store. The heat exchanger may be designed so that the pressure reducing effect from the heat exchanger and the pressure increasing effect from the liquid level increase cancel each other out. This may result in the tank maintaining its pre-fill vapor pressure consistently throughout the filling process.

The heat exchanger may eliminate the need to monitor the pressure and the need to adjust the throttling of the fill line valves. Because the valves do not need to be throttled, they can be removed, saving cost and reducing potential leak points on the tank. Also, since the operator filling the tank will not need to closely monitor the pressure, he/she can allocate more time to other aspects of the filling process, such as safety.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A cryogenic liquid storage tank, comprising:
a vessel for containing a cryogenic liquid;
a fill pipe in communication with the vessel wherein the vessel is filled with the cryogenic liquid via the fill pipe;
a fill termination assembly associated with the fill pipe, the fill termination assembly including a valve having an open position for allowing cryogenic liquid to flow through the fill pipe during filing of the vessel and a closed position for preventing cryogenic liquid from flowing through the fill pipe when the vessel has been filled with a selected amount of cryogenic liquid;
the fill termination assembly including a chamber containing a gas, the chamber having a movable segment and static segment, wherein the static segment extends at least partially into the vessel;
a lever having a first end, a second end and a pivot point between the first and second ends of the lever, the movable segment of the chamber attached to the first end of the lever and the valve attached to the second end of the lever; and
wherein when gas within the chamber decreases to a threshold pressure, the movable segment of the chamber pulls on the first end of the lever so that the lever pivots about the pivot point and the second end of the lever pushes valve to the closed position.

2. The cryogenic liquid storage tank of claim 1 wherein the cryogenic liquid contacts the static segment of the chamber, thereby lowering a temperature of the gas within the chamber, resulting in the gas within the chamber decreasing to the threshold pressure.

3. The cryogenic liquid storage tank of claim 1 wherein the movable segment is an expandable/contractible segment.

4. The cryogenic liquid storage tank of claim 3 wherein the expandable/contractible segment comprises concertina folds or bellows.

5. The cryogenic liquid storage tank of claim 1 wherein the movable segment comprises a piston.

6. The cryogenic liquid storage tank of claim 1 wherein the fill pipe includes a main valve.

7. The cryogenic liquid storage tank of claim 1, further including an arm attaching the movable segment of the chamber to the first end of the lever.

8. The cryogenic liquid storage tank of claim 1, wherein the pivot point of the lever is stationary.

9. A cryogenic liquid storage tank, comprising:
a vessel for containing a cryogenic liquid;
a fill pipe in communication with the vessel wherein the vessel is filled with the cryogenic liquid via the fill pipe;
a fill termination assembly associated with the fill pipe, the fill termination assembly including a valve having an open position for allowing cryogenic liquid to flow through the fill pipe during filing of the vessel and a closed position for preventing cryogenic liquid from flowing through the fill pipe when the vessel has been filled with a selected amount of cryogenic liquid, the valve having a stem;
the fill termination assembly including a chamber containing a gas, the chamber having a movable segment and static segment, wherein the static segment extends at least partially into the vessel and the movable segment is operatively connected to the stem of the valve; and
wherein when gas within the chamber decreases to a threshold pressure, the movable segment of the chamber contracts in a first direction, causing the stem of the valve to move in a second opposite direction to move the valve to the closed position.

10. The cryogenic liquid storage tank of claim 9 wherein the cryogenic liquid contacts the static segment of the chamber, thereby lowering a temperature of the gas within the chamber, resulting in the gas within the chamber decreasing to the threshold pressure.

11. The cryogenic liquid storage tank of claim 9 wherein the movable segment is an expandable/contractible segment.

12. The cryogenic liquid storage tank of claim 11 wherein the expandable/contractible segment comprises concertina folds or bellows.

13. The cryogenic liquid storage tank of claim 9 wherein the movable segment comprises a piston.

14. The cryogenic liquid storage tank of claim 9 wherein the fill pipe includes a main valve.

* * * * *